No. 777,280. PATENTED DEC. 13, 1904.
W. H. DUSENBURY.
DOG MUZZLE.
APPLICATION FILED JUNE 23, 1904.
NO MODEL.

Witnesses
G. R. Thomas
L. Hilton

Inventor
W. H. Dusenbury
By H. B. Willson
Attorney

No. 777,280. Patented December 13, 1904.

UNITED STATES PATENT OFFICE.

WILLIAM H. DUSENBURY, OF NEW YORK, N. Y., ASSIGNOR TO WALTER B. STEVENS AND SON, OF NEW YORK, N. Y., A FIRM.

DOG-MUZZLE.

SPECIFICATION forming part of Letters Patent No. 777,280, dated December 13, 1904.

Application filed June 23, 1904. Serial No. 213,392. (No model.)

*To all whom it may concern:*

Be it known that I, WILLIAM H. DUSENBURY, a citizen of the United States, residing at New York, in the county of New York and State of New York, have invented certain new and useful Improvements in Dog-Muzzles; and I do declare the following to be a full, clear, and exact description of the invention, such as will enable others skilled in the art to which it appertains to make and use the same.

My invention relates to improvements in dog-muzzles, and more particularly to the nose and jaw frames thereof.

The object of my invention is to improve and simplify the construction of devices of this character, and thereby render them less likely to irritate the dog and at the same time more durable in use and less expensive to manufacture.

With this and other objects in view the invention consists of certain novel features of construction, combination, and arrangement of parts, as will be more fully described, and particularly pointed out in the appended claims.

Figure 1:
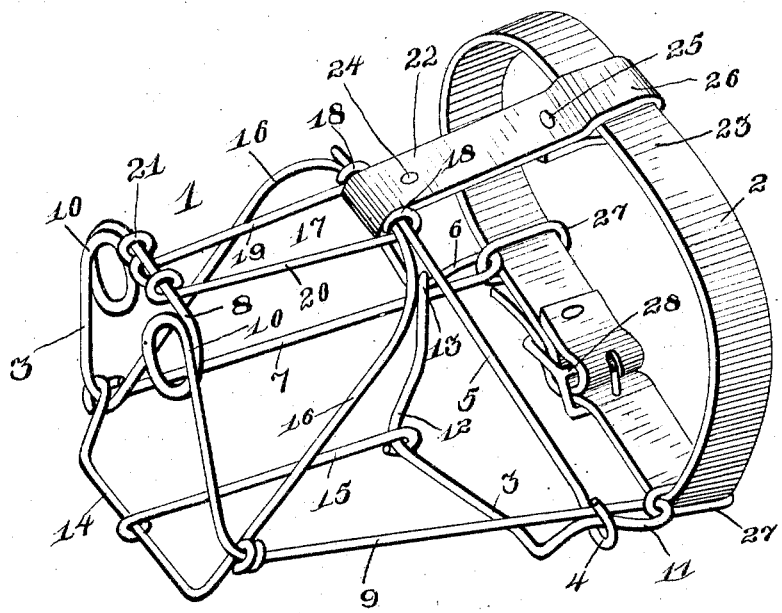
Figure 2:
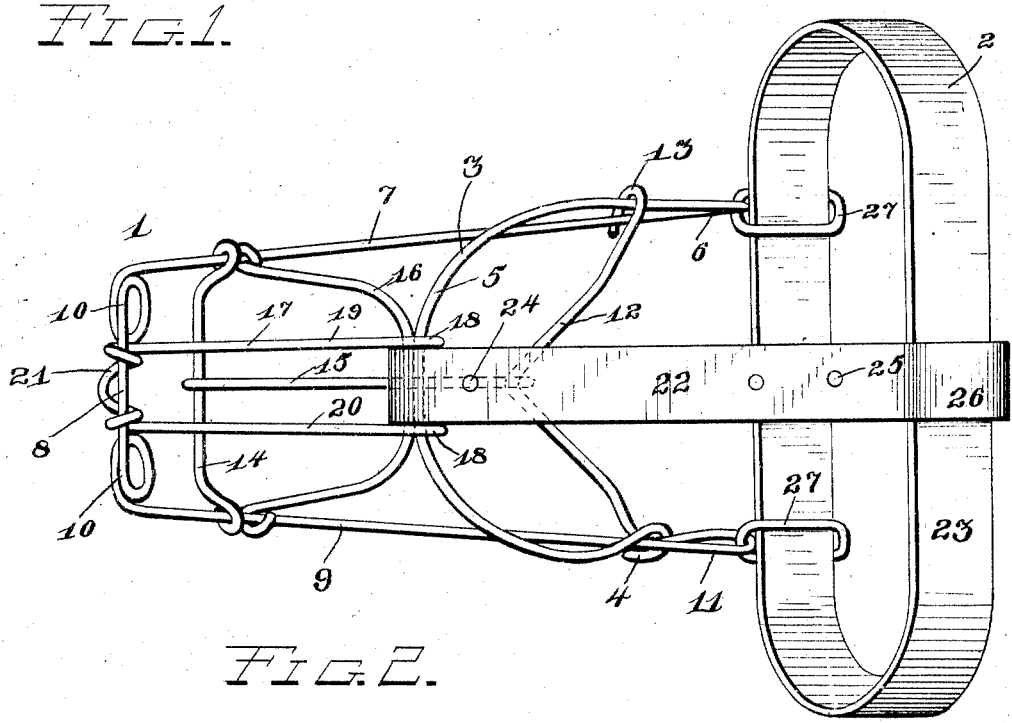

In the accompanying drawings, Figure 1 is a perspective view of a dog-muzzle constructed in accordance with my invention, and Fig. 2 is a top plan view of the same.

Referring to the drawings by numeral, 1 denotes the nose and jaw frame of the muzzle, which is made entirely of bent wire, and 2 denotes the head-stall, which is preferably made of leather, as shown. The wire frame 1, as shown, is composed of five separate pieces of wire, the longest piece 3 of which has one of its ends bent to form an eye 4 and is then bent or curved to form an upwardly and forwardly inclined semicircular bow or arch 5, which is adapted to pass across the rear portion of the nose of the dog. The piece of wire 3 is then bent rearwardly and is folded upon itself to form a loop 6. It then extends forwardly, as at 7, along one side of the dog's mouth, and after being bent to form a front bow or arch 8 it extends rearwardly, as at 9, along the other side of the dog's mouth and is then passed through said eye 4. The said arch 8, which extends over the front end of the dog's nose, is formed with two loops or eyes 10, as shown. Said piece 3 after being passed rearwardly through the eye 4 is bent upon itself to form a loop 11, similar to the said loop 6, and is then repassed through said eye 4 and is bent downwardly, then forwardly, then rearwardly, as at 12, and then upwardly, and has its end bent to form an eye 13, through which the said loop 6 extends.

The said portion 12 forms a cross-piece, which extends under the rear of the lower jaw of the dog and connects the rear portions of the two straight sides 7 and 9 of the frame. The front portions of these parts 7 and 9 are also connected by a downwardly-projecting bow or arch 14, which extends below the front portion of the lower jaw of the dog, and said parts 12 and 14 are connected by a straight connecting-piece 15, which extends longitudinally beneath the lower jaw of the dog. The parts 7 and 9 are further braced by an arch or bow 16, which extends upwardly and rearwardly over the rear portion of the dog's nose. The said arches 5 and 16 are connected together and also braced from the arch 8 by a nose-piece 17, which consists of a single piece of wire doubled upon itself at its center and having its ends bent to form eyes 18, which surround the arches 5 and 16 to secure them together. The two straight portions 19 and 20 of said piece 17 are spaced apart and extend forwardly to the center of the arch 8, about which the central bent portion of the said piece 17 is coiled, as shown at 21, in order to attach the portions 19 and 20 securely to said arch 8.

The head-stall 2 comprises a head-strap 22 and a collar or neck-strap 23. The front end of the strap 22 is passed around the arches 5 and 16 between the eyes 18 and is secured by a rivet or the like 24, and rear end of said strap is folded upon itself and riveted, as at 25, to form a loop or eye 26, through which the collar or neck-strap 23 slides freely. The head-strap 23 also passes loosely through wire links or rings 27, provided in the loops 6 and 11, and the ends of said strap are adjustably connected together by a buckle 28, as shown.

The use and advantages of my invention will be readily understood from the foregoing description, taken in connection with the accompanying drawings. It will be seen that by making the nose and jaw frame entirely of wire it is much easier upon the dog or other animal wearing the muzzle. By making the nose-piece 17 of wire, as shown, the dog is less likely to be irritated than it would be if said piece was made of tin, leather, or other solid material. This construction also produces a stronger and less expensive muzzle, as will be readily seen.

Various changes in the form, proportion, and the minor details of construction may be resorted to without departing from the principle or sacrificing any of the advantages of this invention.

Having thus described my invention, what I claim as new, and desire to secure by Letters Patent, is—

1. A dog-muzzle having front and rear nose-arches and a connecting nose-piece formed of a single piece of wire bent upon itself and coiled at its center upon said front arch and having its ends bent to form eyes through which said rear arch is passed, substantially as described.

2. A dog-muzzle having front and rear nose-arches and connecting side portions formed of a single piece of wire, and a connecting nose-piece formed of a single piece of wire bent upon itself at its center to form two spaced rods or links, the bent center portion of said nose-piece being coiled around said front arch and the ends of said nose-piece being bent around said rear arch, substantially as described.

In testimony whereof I have hereunto set my hand in presence of two subscribing witnesses.

WILLIAM H. DUSENBURY.

Witnesses:
CHAS. A. HAUCK,
JAS. J. HALL.